Jan. 18, 1938.  S. ROESCH  2,105,671

MICROSCOPE

Filed March 18, 1936

Siegfried Roesch
INVENTOR

BY
ATTORNEY

Patented Jan. 18, 1938

2,105,671

UNITED STATES PATENT OFFICE 2,105,671

MICROSCOPE

Siegfried Roesch, Wetzlar, Germany, assignor to Ernst Leitz, G. m. b. H., Wetzlar, Germany Application March 18, 1936, Serial No. 69,499
In Germany March 23, 1935

5 Claims. (Cl. 88—40)

The object of this invention is to provide a device for obtaining colored lights in the bright field as well as in the dark field illumination of a microscope. In the microscope art it is known that contrasting light field and dark fields of illumination of objects may be obtained by arranging two different color filters in the central and the outer ring-formed bundle of light rays. The greatest contrast is obtained when the two color filters have complementary colors like the relation between black and white. However, it is not an easy matter to maintain the complementary colors. It is also expensive to provide the particular shades and necessary large number of filters required, particularly if the colors are to be exchangeable.

The present invention eliminates the above mentioned disadvantage by providing a single device to accomplish the object of the invention, which is based upon the known phenomenon that if a crystal with double refraction is placed between two polarizers having their directions of vibration at right angles to each other then a color of relatively great depth appears and when the one polarizer is rotated into parallelism with the other, which functions as an analyzer, the complementary color appears in a relatively rich shade or tone.

The invention is accordingly embodied in a system comprising placing, below the condenser of a microscope, a double refracting crystal between two polarizers in such a manner that the direction of vibration of the central portion of the analyzer, i. e. the upper polarizer, is at right angles to that of the lower polarizer, while the outer ring-formed portion of the analyzer has its direction of vibration parallel to that of the lower polarizer or vice versa, whereby different complementary colors, depending upon the thickness of the crystal, are obtained.

An anisotropic plate having rotatory polarization may also be used together with a rotatable polarizer. In this case a steady succession of pairs of complementary colors is obtained by rotating the polarizer. The invention further includes the use of dichroic foils as polarizers in order to keep the device within practical limits of size and manipulation and whereby it may be made in dimensions usual for color filter devices.

Figure 1:
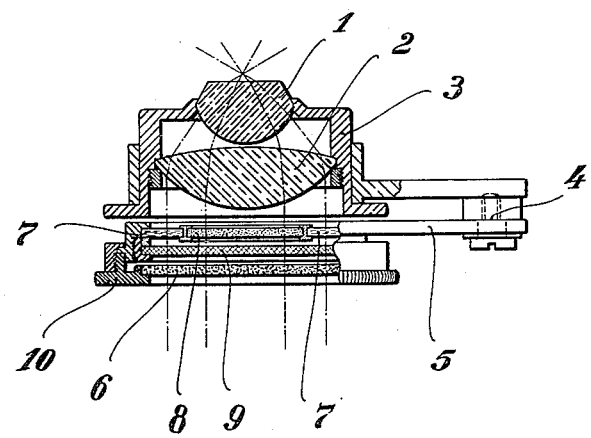
Figure 2:
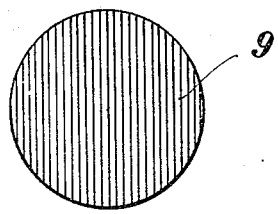
Figure 3:
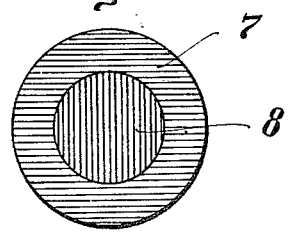

The accompanying drawing illustrates the preferred embodiment of the invention. In said drawing Figure 1 is a sectional view of the condenser part of a microscope together with an illuminating device according to this invention. Figure 2 is a plan view of the crystal plate. Figure 3 is a plan view of the analyzer plate.

The drawing illustrates one embodiment of the invention in which the numerals 1 and 2 denote the condenser of a microscope which is supported in a housing 3. To the latter at 4 there is pivoted in swingable relation a filter frame 5. The latter supports a polarizing foil to function as a polarizer 6 and two polarizing foils 7 and 8 to function as analyzers. The foils 7 and 8 form a single plate as shown in Figure 3. One of the analyzers for instance the foil 7 has its direction of vibration at right angles to that of the polarizer, the other analyzer for instance the foil 8 has its direction of vibration parallel to that of the polarizer. The directions of vibration of the two foils 7 and 8 are at right angles to each other. A crystal plate 9 is interposed between the polarizer 6 and the polarizer 7—8. If a crystal of double refraction is used then the polarizer 6 is non-rotatable. If the crystal possesses the property of rotatory polarization then the polarizer 6 is mounted in a rotatable support 10.

An illuminating device embodying the invention as described above produces a central cone of light of one color surrounded by a ring of light of the color which is complementary to the central cone of light. When the polarizer is rotated, the colors of the lights will change gradually. For instance the central beam may change from an original red color to its complementary green while the outer ring formed beam will change from green to red. However, it is not possible to produce another set of complementary colors except by using another crystal plate of different thickness and this of course may be done. The invention however goes further than that. By using a crystal plate having rotatory polarization an entirely different result is obtained. If now the polarizer is rotated it will be observed that the central light does not gradually fade from its original color into its complementary color, but it will pass through a whole range of colors. The outer ring formed beam of light likewise changes and from these complementary sets of colors one may select a set or two complementary colors best suited for the purpose.

I claim:

1. A device for providing complementary color illumination of the bright field and the dark field in a microscope comprising a condenser, an anisotropic crystal plate, a light polarizing plate above and below the crystal plate, one of the light polarizing plates consisting of a central portion and an outer ring portion, the direction of polarization of light in said central portion being at right angles to the direction of polarization of light in said ring portion, the other light polarizing plate having its direction of polarization of light parallel to that of the said central portion of the first light polarizing plate and means connected to the condenser for supporting the crystal plate and the two light polarizing plates in mutually optical operative relation to each other and to the condenser.

2. A device for providing complementary color illumination for the purpose set forth comprising a condenser, an anisotropic crystal plate, a light analyzing plate above the same consisting of a central portion and an outer ring portion, and a light polarizing plate below the crystal plate, the direction of polarization in the polarizing plate being parallel to the direction of polarization of one of the said portions of the analyzer plate and at right angles to the direction of polarization of the other portion of the analyzer plate and a mounting connected to the condenser for containing and supporting the said three plates in mutually optical operative relation to each other and to the condenser.

3. A device according to claim 1 in which the crystal plate is an anisotropic plate having double refraction.

4. A device according to claim 1, in which the crystal plate has the property of rotatory polarization.

5. A device according to claim 2 in which the crystal plate has the property of rotary polarization and means for rotating the light polarizing plate.

S. ROESCH.